July 13, 1943.    J. R. SHOFFNER    2,324,329
MOTOR DRIVEN CABLE REEL
Filed Jan. 22, 1941    3 Sheets-Sheet 3
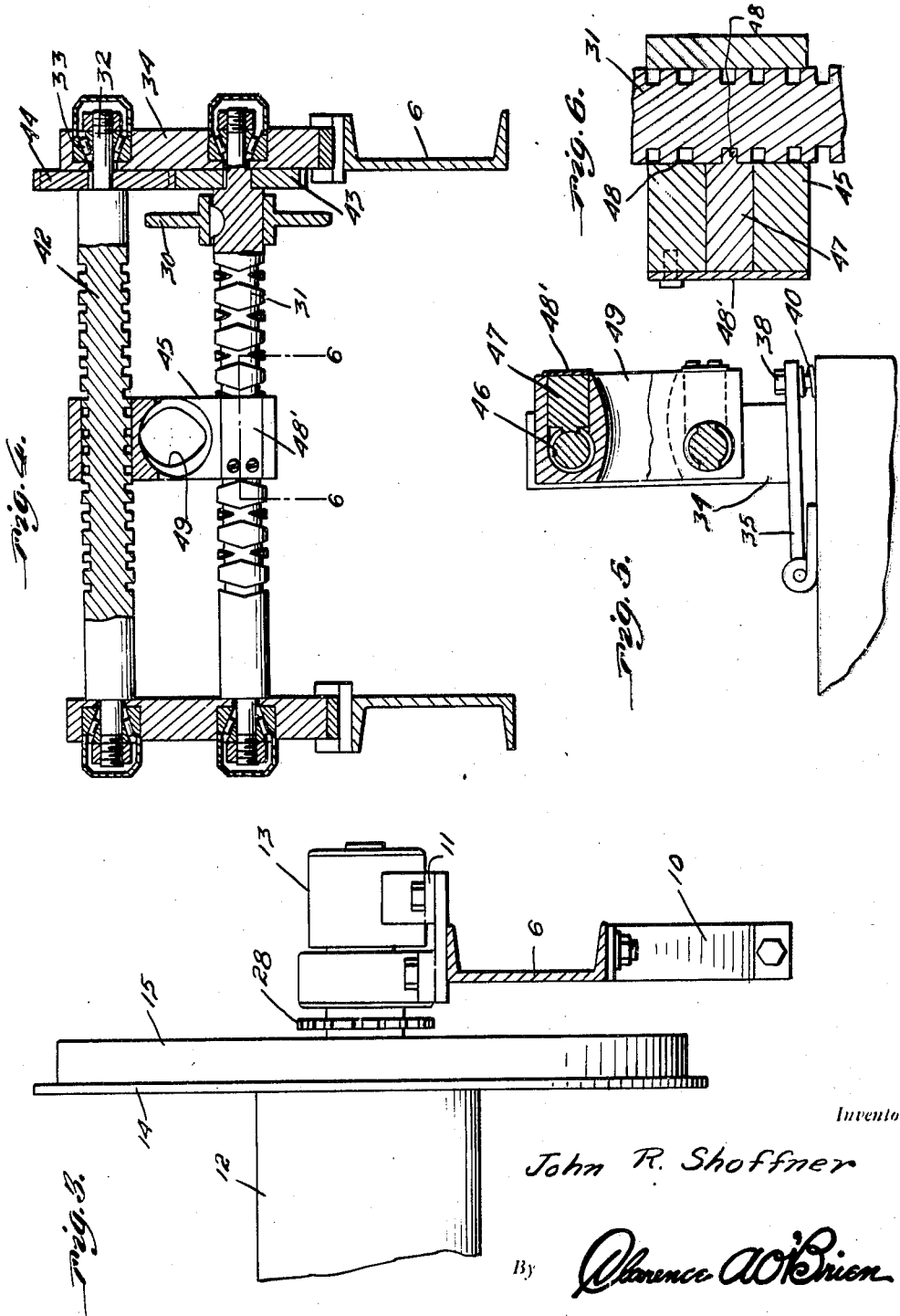
Inventor
John R. Shoffner
By Clarence A. O'Brien
Attorney Patented July 13, 1943

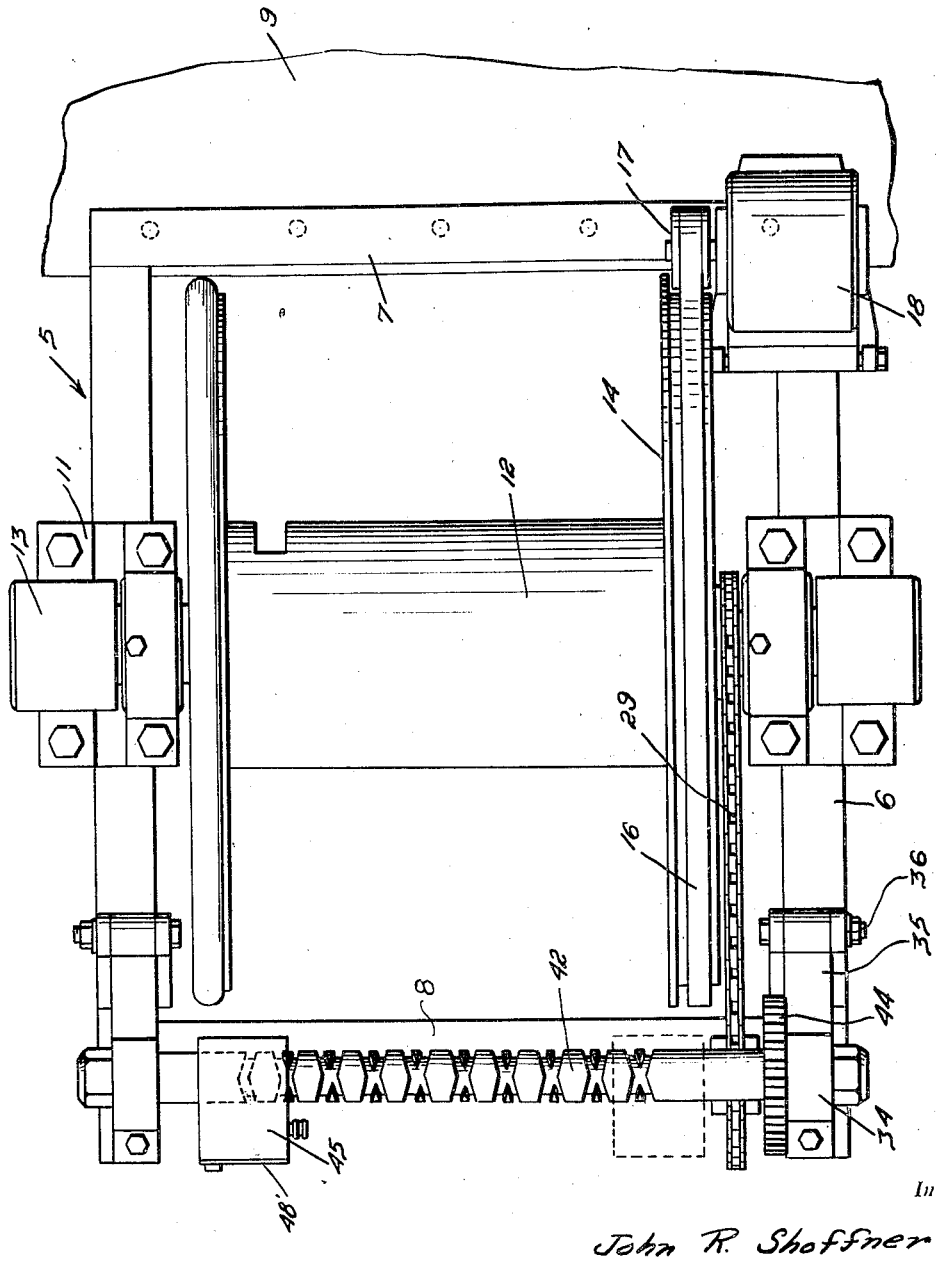

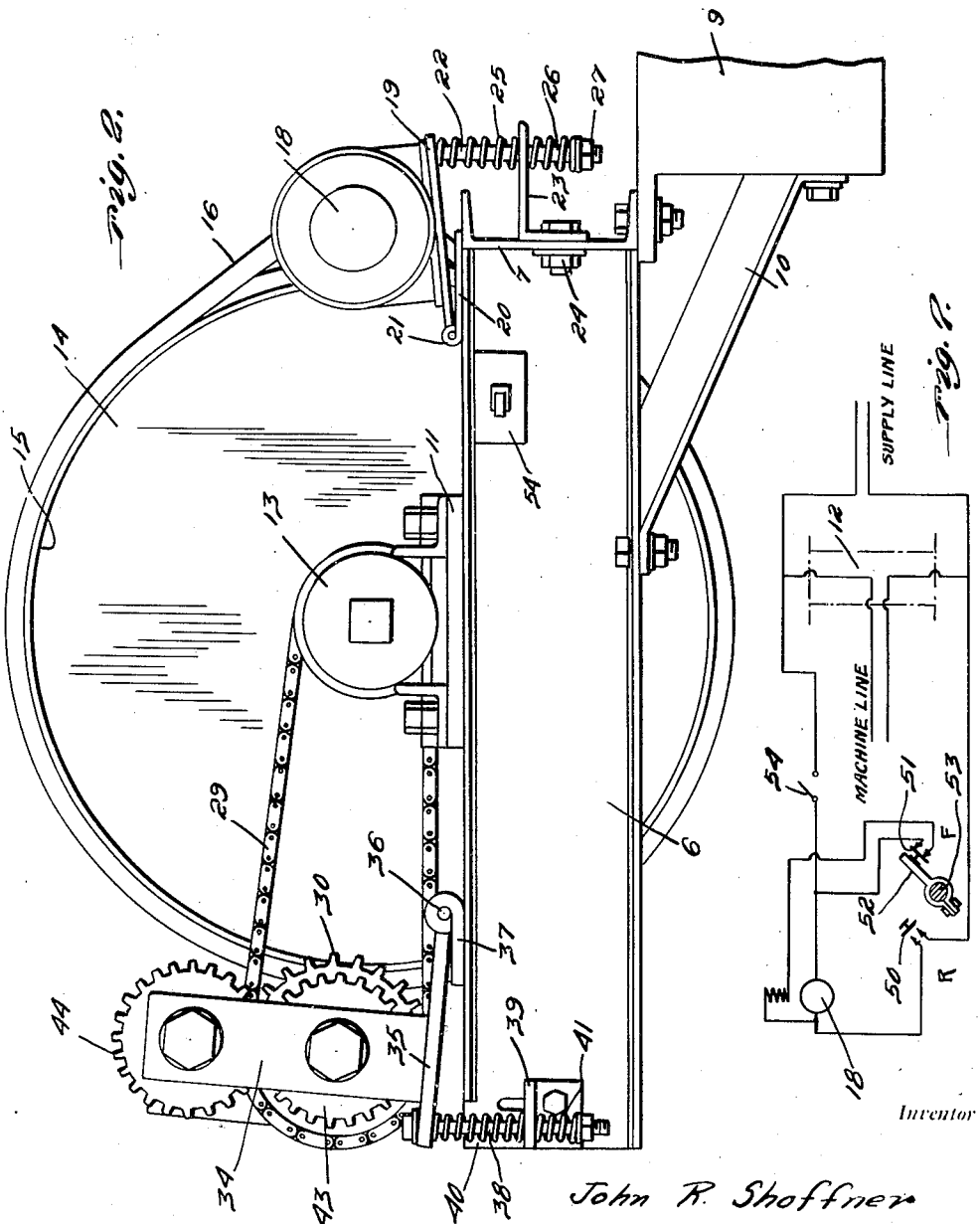

2,324,329

UNITED STATES PATENT OFFICE 2,324,329

MOTOR DRIVEN CABLE REEL

John R. Shoffner, Kittanning, Pa.

Application January 22, 1941, Serial No. 375,493

11 Claims. (Cl. 242—158)

The present invention relates to new and useful improvements in cable reels designed for use in connection with the operation of electrically driven mining machinery and for other industrial purposes wherein it is necessary to reel in or pay out the electric cable on a portable reel in accordance with the movement of the electrical equipment and the present invention has for its primary object to provide a motor driven reel for this purpose.

A further object of the present invention is to provide a traveling guide for the cable in the form of a double screw spooler adapted to travel from side to side of the reel to facilitate the winding of the cable thereon in an orderly fashion.

A further object is to operatively connect the spooler with the motor utilized for driving the reel.

A still further object is to provide a yieldable mounting for the motor as well as the spooler to provide takeup means for the belt or chain drive employed in the operation thereof.

A still further object is to provide an apparatus of this character of simple and practical construction, which is efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which Figure 1 is a top plan view, Figure 2 is a side elevational view, Figure 3 is a fragmentary elevational view of one end of the reel.

Figure 4 is a vertical sectional view through the mounting for the spooler,

Figure 5 is a vertical sectional view through the spooler with parts of the carrier shown in section, Figure 6 is a fragmentary sectional view taken substantially on a line 6—6 of Figure 4, and Figure 7 is a diagram of the electric circuit for the motor.

Referring now to the drawings in detail, wherein for the purpose of illustration I have disclosed a preferred embodiment of the invention, the numeral 5 designates the substantially rectangular-shaped reel supporting frame preferably constructed of channel iron and including the pair of longitudinally extending frame members 6, the front end frame member 7 and the rear transverse frame member 8, the frame members being welded or otherwise permanently secured to each other at their end portions.

The frame members are preferably constructed of channel iron and the front end frame member 7 may be bolted to part of a mining machinery truck or other mining equipment designated at 9 and supported thereon by means of brace members 10 extending from the under side of the frame 5 to the truck 9.

To each of the longitudinal frame members 6 is secured the bearing brackets 11 in which the ends of the cable reel 12 are journalled, the bearings for the reel including the commutator housings 13 for supplying the electrical connection to the cable when wound on the reel, the commutator preferably being of a construction disclosed in my copending application Serial No. 367,150, filed the 25th day of November, 1940.

The reel 12 includes the flanges 14 adjacent the end portions thereof, one of the flanges having the drum 15 secured on the outer side of the flange and about which extends the belt 16 operated from a pulley 17 of an electric motor 18, the motor being suitably mounted on a plate 19 which is hingedly connected at one end to a plate 20 fixedly secured to the frame 5, the hinge construction being designated at 21.

Extending downwardly from the other end of the plate 19 is a bolt 22 which slidably extends through a bracket 23 bolted to the rear frame member 7, as shown at 24, the bolt having an upper coil spring 25 mounted thereon and positioned between the bracket 23 and the under side of the plate 19 and a lower coil spring 26 is also mounted on the bolt and positioned between the under side of the bracket 23 and a nut 27 which is threaded on the lower end of the bolt, as shown to advantage in Figure 2 of the drawings.

To one end of the reel 12 is secured a sprocket wheel 28 adapted for driving a chain 29 extending over a sprocket wheel 30 keyed or otherwise secured to a double screw spooler 31 of conventional construction.

Each end of the spooler is formed with spindles 32 which are journalled in roller bearing assemblies 33 mounted in upstanding supports 34 positioned at each side of the frame 5 with their lower ends welded or otherwise secured to plates 35. The plates 35 are also hinged at one end to plates 37 which are welded or otherwise secured to the longitudinal frame members 6 adjacent their rear ends.

Bolts 38 extend downwardly through the plates 35 at their rear ends, the bolts freely extending through brackets 39 secured to the longitudinal frame members 6 and upper and lower coil springs 40 and 41 respectively are also carried by the bolts to provide a yieldable adjustable mounting for the spoolers similar to the mounting for the motor 18 as heretofore described.

A second spooler 42 is provided with its ends journalled in the upper portion of the supports 34, the spooler 42 being of identical construction to the spooler 31, except for the sprocket 30, and the spoolers are arranged in spaced parallel relation to provide a double spooler construction extending horizontally at the rear end of the frame 5. The spoolers 31 and 42 are connected for uniform rotation by means of gears 43 and 44.

A carrier 45 is mounted for longitudinal movement on the spoolers upon the rotation thereof, the carrier having bores 46 through which the spoolers are inserted and communicating with the bores are removable plugs 47 secured thereto by spring plates 48' attached to the carrier, the inner ends of the plugs having a tooth 48 adapted to travel in the grooves of the spoolers in a manner well known in the art.

The intermediate portion of the carrier is provided with a guide opening 49 through which the cable is extended while being wound or unwound on the reel 12.

It will be understood that a suitable electrical connection is provided for the motor 18 from a source of current carried by the truck 9, or other mining equipment, whereby to drive the reel for winding or unwinding the cable thereon, the double spoolers being likewise driven by the reel through the chain 29 and the threads or grooves of these spoolers are properly synchronized for moving the carrier 45 longitudinally of the spoolers in accordance with the winding or unwinding of the cable on the reel.

While I have shown the reel frame 5 attached in position on the truck or other mining equipment 9 it will be understood that the reel frame also may be suitably supported on rubber-tired wheels to provide an independent portable unit.

As shown in Figure 7 of the drawings, the motor 18 is connected in the supply line for the cable to be wound or unwound on the reel. The motor is of the reversible type to operate the reel in opposite directions to produce the winding or unwinding action, when desired, and forward and reversing switches 50 and 51, respectively, are provided for the motor for this purpose. The switches are actuated in accordance with the direction of travel of the truck or machine on which the reel is mounted by means of an arm 52 frictionally clamped on the axle 53 of the truck, the arm being swingable in opposite directions to engage the push-button type switches and the clamp for the arm is adjusted on the axle to permit slipping after the arm has contacted one of the switches. A manual switch 54 is also provided for the motor to control the same.

When the device is mounted on an electrically driven mining machine of a type having the usual swingable control lever adapted for movement in opposite directions to drive the machine forwardly and rearwardly, the arm 52 may be clamped on the shaft of said lever in place of the axle 53 for engaging the switches 50 and 51 to actuate the reel in accordance with the manipulation of the lever.

It is believed the details of construction, advantages and manner of use of the device will be readily understood from the foregoing without further detailed explanation.

What I claim is:

1. A motor driven cable reel comprising a support for the reel, a motor, drive means between the motor and reel for rotating the reel to wind a cable thereon, a spooler for the cable, drive means for the spooler, hinged mountings for the motor and the spooler and yieldable supporting means for the mountings.

2. A motor driven cable reel comprising a support for the reel, a motor, flexible drive means between the motor and the reel for rotating the reel to wind a cable thereon, a spooler for the cable, flexible drive means for the spooler, supporting bases for the motor and the spooler, said bases being hingedly connected at one edge and yieldable supporting means for the opposite edges of the bases.

3. A motor driven cable reel comprising a support for the reel, a motor, flexible drive means between the motor and reel for rotating the reel to wind a cable thereon, a spooler for the cable, flexible drive means for the spooler, supporting bases for the motor and the spooler, said bases being hingedly connected at one edge, spring means yieldably supporting the opposite edges of the bases and means for tensionally adjusting the springs to take up the respective flexible drive means.

4. A motor driven cable reel comprising a support for the reel, a motor, flexible drive means between the motor and reel for rotating the reel to wind a cable thereon, a spooler for the cable comprising a pair of vertically spaced double screws, a carrier operated by the screws having an opening for freely receiving the cable, gears connecting the screws for simultaneous rotation and flexible drive means for one of the screws.

5. A motor driven cable reel comprising a support for the reel, a motor, flexible drive means between the motor and reel for rotating the reel to wind a cable thereon, a spooler for the cable comprising a pair of vertically spaced double screws, a carrier operated by the screws having an opening for freely receiving the cable, gears connecting the screws for simultaneous rotation, flexible drive means for the screws, supports for the ends of the screws, a hinged base for the supports, and spring means yieldably supporting said bases.

6. A motor driven cable reel comprising a support for the reel, a motor, flexible drive means between the motor and reel for rotating the reel to wind a cable thereon, a spooler for the cable comprising a pair of vertically spaced double screws, a carrier for the cable having openings freely receiving the respective screws, plugs secured to the carrier communicating with the openings, a tooth on the inner end of the plugs adapted to travel in the grooves of the screws for actuating the carrier, gears connecting the screws for simultaneous rotation and flexible drive means for the screws.

7. A motor driven cable reel comprising a support for the reel, a motor, flexible drive means between the motor and reel for rotating the reel to wind a cable thereon, a spooler for the cable comprising a pair of vertically spaced double screws, a carrier freely mounted on the screws and having a guide opening for the cable, plugs in the carrier having means adapted to ride in the grooves of the screws for actuating the carrier upon rotation of the screws, a spring plate yieldably maintaining the plug in position and means for simultaneously operating the screws.

8. A spooler construction comprising a pair of spaced parallel double screws connected for uniform rotation, a carrier having a pair of openings freely receiving the screws for movement thereon, and plugs mounted in the carrier, each plug having a lug adapted to engage the respective screws for actuating the carrier upon rotation of the screws.

9. A spooler construction comprising a pair of spaced parallel double screws connected for uniform rotation, a carrier having a pair of openings freely receiving the screws for movement thereon, plugs mounted in the carrier, each plug having a lug on its inner end adapted to engage the respective screws for actuating the carrier upon rotation of the screws, and means obstructing removal of the plugs from the carrier.

10. A spooler construction comprising a pair of spaced parallel double screws connected for uniform rotation, a carrier having a pair of openings freely receiving the screws for movement thereon, plugs mounted in the carrier, each plug having a lug on its inner end adapted to engage the respective screws for actuating the carrier upon rotation of the screws, and yieldable members forming an abutment for the rear ends of the plugs to secure the latter in position in the carrier.

11. A spooler construction comprising a pair of spaced double screws connected together for synchronous rotation, a carrier having separate openings through which said screws extend, thread-engaging means movably mounted on said carrier for engaging each such screw, and means for yieldingly holding each of said screw-engaging means in engagement with its respective screw.

JOHN R. SHOFFNER.